United States Patent
D'Souza et al.

(10) Patent No.: US 8,102,780 B2
(45) Date of Patent: *Jan. 24, 2012

(54) METHOD AND APPARATUS FOR PERFORMING REACHABILITY TESTING WITHIN THE CONTEXT OF CUSTOMER VIRTUAL PRIVATE NETWORKS

(75) Inventors: Kevin L. D'Souza, Cranbury, NJ (US); Leah Zhang, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/647,486

(22) Filed: Dec. 26, 2009

(65) Prior Publication Data

US 2010/0097943 A1    Apr. 22, 2010

Related U.S. Application Data

(63) Continuation of application No. 10/955,830, filed on Sep. 30, 2004, now Pat. No. 7,664,043.

(60) Provisional application No. 60/584,822, filed on Jul. 1, 2004.

(51) Int. Cl.
*H04L 12/26*    (2006.01)

(52) U.S. Cl. .................................... 370/248; 370/249
(58) Field of Classification Search .......... 370/216–228, 370/241–253, 254–255
See application file for complete search history.

(56) References Cited

U.S. PATENT DOCUMENTS

| | | | |
|---|---|---|---|
| 7,006,499 B2* | 2/2006 | Tingle et al. | 370/392 |
| 7,124,187 B1 | 10/2006 | Kodialam et al. | |
| 7,154,851 B1 | 12/2006 | Fedyk et al. | |
| 7,664,043 B1 | 2/2010 | D'Souza et al. | |
| 2002/0131424 A1* | 9/2002 | Suemura | 370/400 |
| 2005/0022189 A1* | 1/2005 | Proulx et al. | 718/100 |
| 2005/0094567 A1 | 5/2005 | Kannan et al. | |
| 2005/0281204 A1 | 12/2005 | Karol et al. | |
| 2006/0203719 A1 | 9/2006 | Kim et al. | |

* cited by examiner

*Primary Examiner* — Pao Sinkantarakorn

(57) ABSTRACT

In one embodiment, the invention comprises a method and apparatus for verifying connectivity in a network comprising a plurality of provider edge routers and a plurality of customer edge routers facilitating communication within at least one customer virtual private network. In another embodiment, the invention comprises a method for determining respective operational statuses of edge communication links between provider edge routers and customer edge routers. In another embodiment, the invention comprises a method for verifying site-to-site reachability within the context of customer virtual private networks.

15 Claims, 8 Drawing Sheets

METHOD AND APPARATUS FOR PERFORMING REACHABILITY TESTING WITHIN THE CONTEXT OF CUSTOMER VIRTUAL PRIVATE NETWORKS

This application is a continuation of U.S. patent application Ser. No. 10/955,830, filed Sep. 30, 2004, now U.S. Pat. No. 7,664,043, which claims the benefit of U.S. Provisional Application No. 60/584,822 filed on Jul. 1, 2004, both of the above cited applications are incorporated herein in their entirety by reference.

FIELD OF THE INVENTION

The invention relates to the field of communications networks, and more specifically, to performing site-to-site reachability monitoring within virtual private networks.

BACKGROUND OF THE INVENTION

A virtual private network (VPN) securely connects multiple customer sites that are possibly geographically dispersed and wish to communicate among each other. A virtual private network is essentially a secure, private communication network that utilizes a service provider's network (such as AT&T's core network) in order to connect remote sites and users together. In many cases, virtual private network customers contract with the virtual private network service provider to have the service provider manage their virtual private network assets.

In order to maintain reachability and network availability service level agreements, a service provider often monitors the reachability among endpoints in a customer's virtual private network across that service provider's network. A service provider will attempt to detect with high probability a situation in which traffic cannot be sent from a virtual private network interface on one provider edge router to a virtual private network interface on another provider edge router within the same virtual private network. In other words, a service provider monitors site-to-site reachability between customer sites in customer virtual networks.

In one conventional method of reachability testing, the reachability must be tested between every pair-wise combination of provider-edge/customer-edge links (interfaces) within the context of each customer virtual private network. It is obvious that such conventional methods do not scale well in large networks. The number of reachability tests that must be conducted is a factor of both the number the customer virtual private networks, as well as the number of pairs of interfaces within each of those customer virtual private networks. Furthermore, since a single provider edge router often supports numerous virtual private networks, reachability tests are repeated numerous times on those provider edge routers.

As a network grows, the number of reachability tests required while using conventional methods grows exponentially. Such a large increase in the number of reachability tests invariably increases the time required in order to perform reachability testing. This is especially true when a full network reachability test is performed for all customer virtual private networks supported by the service provider's network. Furthermore, as the number of reachability tests increases, the amount of test traffic on the network increases, using valuable network resources that can no longer be used to support customer traffic and services.

In addition to exhaustively testing pair-wise reachability between every pair of interfaces within the context of each customer virtual private network, another method of testing customer virtual private network interfaces involves building, in an offline network management system, a model of the label switched paths that constitute the network. The network management system then queries the network for status on each of the label switched paths, and constructs a cause-effect relationship within the offline management system that relates a label switched path failure to that of a pair of virtual private network interfaces.

Unfortunately, this method of modeling label switched paths in an offline network management system has a number of disadvantages. There is no simple, scalable method of querying the status of every label switched path within the network. Furthermore, since single-hop label switched paths may be shared among multiple customer virtual private networks, and this mapping is done dynamically, it is difficult to attribute the failure of a label switched path to the set of customer virtual private networks that are affected.

As such, a need exists in the art for a simple, scalable method of testing site-to-site reachability within the context of customer virtual private networks by testing connectivity between pairs of provider edge routers in a service provider network, and verifying existence of routes associated with edge communication links (links from a customer edge router to a provider edge router) to ensure the links are operational.

SUMMARY OF THE INVENTION

In one embodiment, the invention comprises a method for verifying connectivity in a network comprising a plurality of provider edge routers and a plurality of customer edge routers facilitating communication within at least one customer virtual private network. Specifically, the method comprises establishing at least one network management virtual private network comprising at least two provider edge routers of the plurality of provider edge routers, and initiating at least one connectivity test between at least one pair of provider edge routers in the at least one network management virtual private network.

In another embodiment, the invention comprises a method for determining respective operational statuses of edge communication links between provider edge routers and customer edge routers. Specifically, the method comprises identifying a plurality of provisioned routes, wherein each of the provisioned routes corresponds to respective edge communication links provisioned in a service provider network, identifying a plurality of active routes, where each of the active routes corresponds to respective edge communication links active in the service provider network, and comparing the provisioned routes to the active routes for determining respective operational statuses of said provisioned routes.

In another embodiment, the invention comprises a method for verifying site-to-site reachability within the context of customer virtual private networks. Specifically, the method comprises establishing a network management virtual private network including at least two of a plurality of provider edge routers, wherein the provider edge routers support a service provider network having a plurality of customer virtual private networks, performing connectivity tests between at least one pair of provider edge routers in the network management virtual private network, wherein each of the connectivity tests verifies that at least one forward communication and one return communication path exists between the respective pairs of provider edge routers, and verifying that edge communication links are operational, wherein the edge communication links connect the plurality of provider edge routers to a respective plurality of customer edge routers.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a virtual private network topology supporting multiple customer virtual private networks; however, the methodologies of the invention can readily be applied to other varied network topologies. The present invention enables verification of site-to-site reachability between pairs of provider edge routers supporting multiple customer VPNs. The testing of VPN site-to-site reachability between any pair of VPN interfaces across multiple provider edge routers is effectively accomplished within the context of any other VPN provisioned across that same pair of provider edge routers. This observation is used to define a scalable method of monitoring VPN site-to-site reachability without the need to run such tests within the context of each customer VPN. Similar results are obtained by running such tests within the context of a service provider's network management virtual private network.

Figure 1:
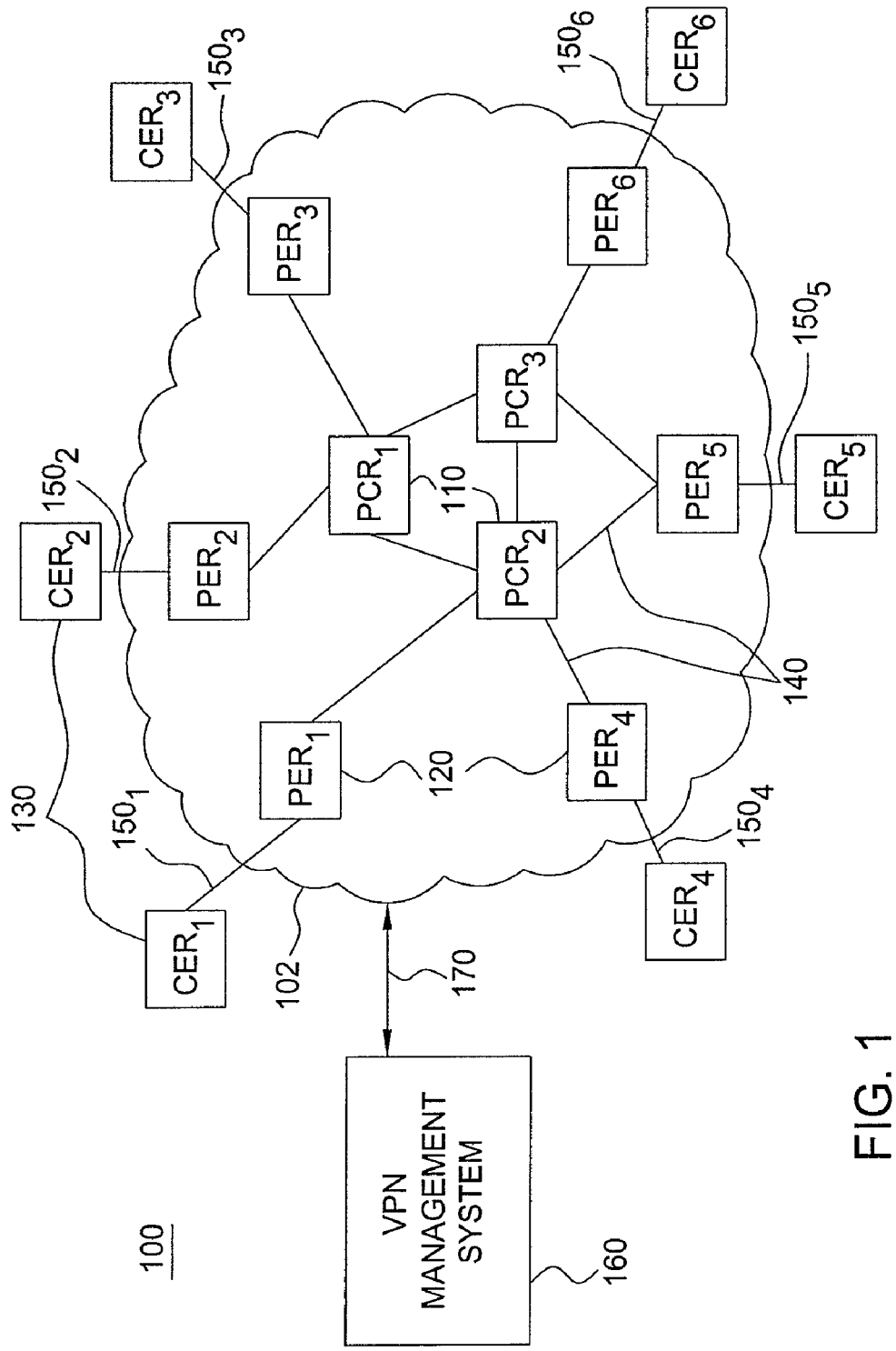
FIG. 1 depicts an exemplary virtual private network including a plurality of customer edge routers, a plurality of service provider edge routers, and a core network interconnecting the provider edge routers.

FIG. 1 depicts an exemplary virtual private network including a plurality of customer edge routers, a plurality of service provider edge routers, and a core network interconnecting the provider edge routers. Specifically, the virtual private network 100 of FIG. 1 comprises a plurality of provider core routers ($PCR_1$-$PCR_3$) 110, a plurality of provider edge routers ($PER_1$-$PER_6$) 120, and a plurality of customer edge routers ($CER_1$-$CER_6$) 130. The provider core routers 110 and the provider edge routers 120 communicate via core communication links 140. The provider core routers 110, provider edge routers 120, and core communication links 140 typically belong to a telecommunication service provider, such as AT&T, and as such, are collectively denoted as service provider network 102 in FIG. 1.

As depicted in FIG. 1, service provider network 102 is managed by a virtual private network management system (VPN-MS) 160. The VPN-MS 160 communicates with service provider network 102 via at least one communication link 170. As such, the VPN-MS 160 communicates with each of the plurality of provider core routers 110, as well as each of the plurality of provider edge routers 120. In one embodiment, the at least one communication link 170 is connected to one of the provider edge routers 120, providing direct access from the VPN-MS 160 to the virtual private network 100 of FIG. 1.

In one embodiment, a service provider's network management boundary extends beyond the edges of the service provider's network into a customer's sub-network. As depicted in FIG. 1, for example, the reach of the VPN-MS 160 would extend beyond the edge of the service provider network 102, in which case VPN-MS 160 could potentially communicate with one or more of the plurality of customer edge routers 130.

The plurality of customer edge routers 130 communicate with the plurality of provider edge routers 120 via edge communication links $150_{1-6}$. As depicted in FIG. 1, each of the customer edge routers $CER_1$ through $CER_6$ communicates with each of the provider edge routers $PER_1$ through $PER_6$ via the edge communication links 150, respectively. Since each customer edge router 130 belongs to the same VPN, each of the customer edge routers 130 is able to send and receive data from every other customer edge router 130.

The customer edge routers 130 typically operate as gateways by which customer sub-networks (not shown) connect to a telecommunication service provider's backbone network (illustratively, service provider network 102). A customer sub-network typically includes at least one customer edge router, as well as computers, telephones, facsimile machines, and other networking equipment located at a particular customer location.

Although one VPN is depicted in FIG. 1, numerous VPNs may be supported by service provider network 102 depicted in FIG. 1. As such, the service provider network 102 may include fewer or more provider core routers, fewer or more provider edge routers, and fewer or more core communication links. Thus, although depicted as a one-to-one relationship between the customer edge routers 130 and the provider edge routers 120, numerous other customer edge routers (not shown) belonging to other VPNs (not shown) may communicate with the provider edge routers 120.

Figure 2:
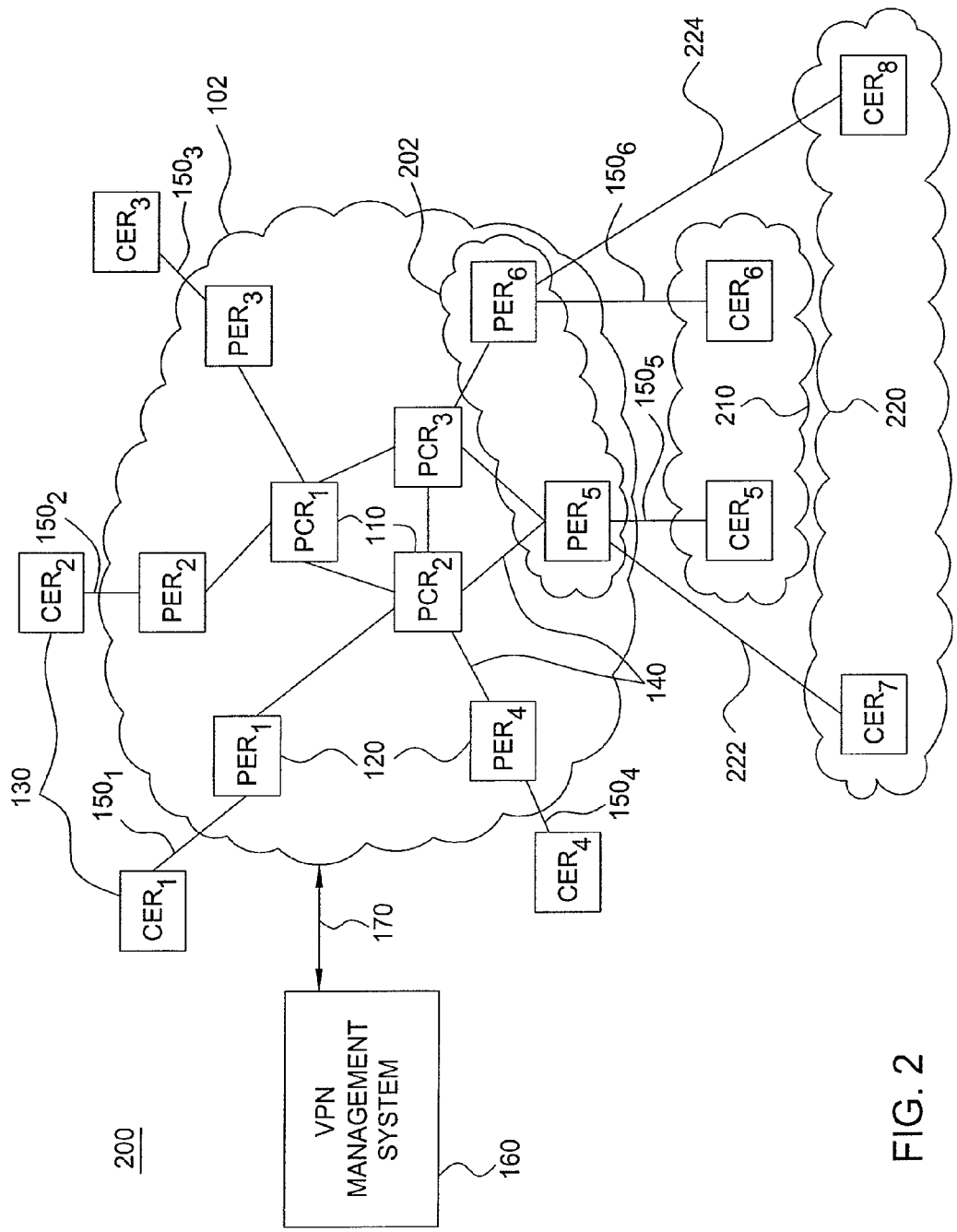
FIG. 2 depicts a network architecture including two customer virtual private networks communicating over the service provider network 102 of FIG. 1, as well as a network management virtual private network including all provider edge routers of the service provider network 102 of FIG. 1.

FIG. 2 depicts a network architecture including two customer virtual private networks communicating over the service provider network 102 of FIG. 1, as well as a network management virtual private network including all provider edge routers of service provider network 102 of FIG. 1. Specifically, the network architecture 200 of FIG. 2 comprises a first virtual private network 210 (VPN1) and a second virtual private network 220 (VPN2). The network architecture 200 of FIG. 2 includes elements depicted in FIG. 1, and, as such, the elements of FIG. 2 which are the same as elements depicted in FIG. 1 are represented with identical reference numbers.

The first virtual private network 210 comprises customer edge router $CER_5$ and customer edge router $CER_6$. As depicted in FIG. 1 and described above, customer edge routers $CER_5$ and $CER_6$ communicate via the service provider network 102. The second virtual private network 220 comprises additional customer edge routers $CER_7$ and $CER_8$ that are not depicted in FIG. 1. The customer edge routers $CER_7$ and $CER_8$ communicate via the service provider network 102. The first VPN 210 and the second VPN 220 are customer VPNs.

In particular, as described above with respect to FIG. 1, the customer edge router $CER_5$ is connected to the provider edge router $PER_5$ via the edge communication link $150_5$. Similarly, customer edge router $CER_6$ is connected to provider edge router $PER_6$ via the edge communication link $150_6$. As depicted in FIG. 2, customer edge router $CER_7$ is connected to provider edge router $PER_5$ via the edge communication link 222. Similarly, customer edge router $CER_8$ is connected to provider edge router $PER_6$ via the edge communication link 224.

Although the first VPN 210 and the second VPN 220 are both carried over service provider network 102, the VPNs are transparent to each other. Although two customer VPNs are depicted, fewer or more customer VPNs may be supported by the service provider network 102. Although the first VPN 210 and second VPN 220 are each depicted as comprising two customer edge routers, fewer or more customer edge routers may be included within a customer VPN.

In order to simplify testing between pairs of the provider edge routers 120 within the service provider network 102, the network architecture 200 of FIG. 2 includes a network management virtual private network (NM-VPN) 202. As depicted in FIG. 2, NM-VPN 202 includes provider edge routers $PER_5$ and $PER_6$. Although depicted as including $PER_5$ and $PER_6$, those skilled in the art will appreciate that the NM-VPN 202 may include a single provider edge router (such as $PER_5$), or any combination of provider edge routers 120 as depicted in FIG. 2.

In one embodiment, a NM-VPN includes all provider edge routers in a service provider network. In another embodiment, multiple NM-VPNs may be provisioned to include all provider edge routers, or subsets of provider edge routers, in a service provider network. For example, a first NM-VPN may be configured to include provider edge routers $PER_1$ and $PER_2$ and a second NM-VPN may be configured to include provider edge routers $PER_3$ and $PER_4$.

The NM-VPN 202 is a VPN established by the service provider. The NM-VPN 202 is provisioned by the service provider using a management system (illustratively, VPN-MS 160). The NM-VPN 202 includes at least one logical internet protocol address (a loopback interface, for example) on each provider edge router included as part of NM-VPN 202. The NM-VPN 202 is a customer-agnostic VPN in that it is transparent to all customer VPNs supported on the service provider network 102 (such as first VPN 210 and second VPN 220). As such, NM-VPN 202 does not support customers and is not associated with any customer interface. Furthermore, NM-VPN 202 has no impact on service provisioning, service management, billing, and like functionality.

In one embodiment, a single connectivity test is performed to verify connectivity between one pair of provider edge routers in NM-VPN 202. In another embodiment, a plurality of connectivity tests is performed to verify connectivity between a subset of the pairs of provider edge routers in NM-VPN 202. In another embodiment, a full pair-wise connectivity test is performed to verify connectivity between all provider edge routers in NM-VPN 202.

Using the NM-VPN 202, the present invention simplifies the testing of connectivity between pairs of provider edge routers in service provider network 102. For example, using the methodologies of the present invention, only one connectivity test is required between provider edge router $PER_5$ and provider edge router $PER_6$ as depicted in FIG. 2. The present invention obviates the need to perform two connectivity tests (one within the context of VPN1, and another within the context of VPN2) in order to confirm the reachability between provider edge routers $PER_5$ and $PER_6$ (as required by conventional reachability testing methods).

In order to perform connectivity tests, a service provider management system (illustratively, VPN-MS 160) identifies pairs of provider edge routers between which the connectivity tests are scheduled to be performed. The VPN-MS 160 identifies a configured interface on each of the provider edge routers between which connectivity is tested. In one embodiment, the configured interfaces are stored locally on the VPN-MS 160. In another embodiment, the configured interfaces are retrieved by the VPN-MS 160 from at least one remote database.

After identifying the configured interfaces on each of the respective provider edge routers 120 for which connectivity tests are scheduled to be performed, a connectivity test is performed between each of those provider edge routers. In one embodiment, in which bidirectional connectivity testing is performed, two connectivity tests are performed for each pair of provider edge router in order to verify connectivity in both directions of transmission. In another embodiment, in which unidirectional connectivity testing is performed, one connectivity test is performed for each pair of provider edge routers in order to verify connectivity in one direction of transmission. A connectivity test is initiated from a configured interface on one provider edge router in the identified pair to a configured interface on another provider edge router.

In bidirectional testing, for example, in order to conduct a full pair-wise connectivity test between all of the provider edge routers 120 in NM-VPN 202, respective individual connectivity tests are performed from provider edge router $PER_1$ to each of the other provider edge routers $PER_2$ through $PER_6$. Similarly, respective individual connectivity tests are performed from provider edge router $PER_2$ to each of the other provider edge routers $PER_1$, and $PER_3$ through $PER_6$. Finally, individual connectivity tests are performed from provider edge router $PER_6$ to each of the other provider edge routers $PER_1$ through $PER_5$. Thus, connectivity is tested in both directions of transmission from every provider edge router to every other provider edge router in NM-VPN 202.

In unidirectional testing, for example, in order to conduct a full pair-wise connectivity test between all of the provider edge routers 120 in NM-VPN 202, respective individual connectivity tests are performed from provider edge router $PER_1$ to each of the other provider edge routers $PER_2$ through $PER_6$. Similarly, respective individual connectivity tests are performed from provider edge router $PER_2$ to each of the provider edge routers $PER_3$ through $PER_6$. This pattern continues until finally, an individual connectivity test is performed from provider edge router $PER_5$ to provider edge router $PER_6$. Therefore, since unidirectional testing assumes that testing connectivity in one transmission direction is equivalent to testing connectivity in both transmission directions, unidirectional connectivity testing further reduces the number of connectivity tests required to test connectivity between provider edge routers of NM-VPN 202.

In order to initiate a connectivity test, the VPN-MS 160 transmits at least one "initiate connectivity test" message towards each provider edge router that will initiate a connectivity test. An "initiate connectivity test" message may be implemented using at least one of a service provider proprietary messaging protocol and any suitable message defined in a standard network management protocol as known in the art (Simple Network Management Protocol (SNMP), Common Management Information Protocol (CMIP), TELNET, and the like).

In one embodiment, a single "initiate connectivity test" message is created and transmitted for each connectivity test being performed. For example, if connectivity between provider edge router $PER_1$ and provider edge routers $PER_2$ and $PER_3$ is identified for testing, provider edge $PER_1$ receives one "initiate connectivity test" message with respect to provider edge router $PER_2$ and a separate "initiate connectivity test" message with respect to $PER_3$.

In another embodiment, a single "initiate connectivity test" message identifies provider edge routers with which the provider edge router receiving the "initiate connectivity test" message tests connectivity. For example, if connectivity between provider edge router $PER_1$ and provider edge routers $PER_2$ and $PER_3$ is identified for testing, provider edge $PER_1$ receives one "initiate connectivity test" message identifying provider edge routers $PER_2$ and $PER_3$.

The testing of connectivity between a pair of provider edge routers is accomplished using at least one of a plurality of methods. In one embodiment, a connectivity test between a pair of provider edge routers in the NM-VPN 202 is conducted using a ping command. In this embodiment, the provider edge router that received the "initiate connectivity test" message processes the "initiate connectivity test" message to identify a provider edge router with which connectivity is to be tested, and executes a "ping" command in order to ping that provider edge router.

In one such embodiment, a "ping vrf" command is used in order to perform the connectivity test. In this embodiment, the "ping vrf" test is used to ensure that there is at least one forward label-switched path and at least one return label-switched path between the pair of provider edge routers for which the connectivity test is performed (between the provider edge router that received the "initiate connectivity test" message and the provider edge router identified in the "initiate connectivity test" message). Since a "ping vrf" command is initiated within the context of a VPN, each "ping vrf" command is initiated within the context of the NM-VPN 202.

In another embodiment, in order to perform a connectivity test the service provider management system initiating the connectivity test (VPN-MS 160, for example) establishes a "telnet" session with the provider edge router from which the connectivity test is initiated. Telnet is a telecommunications protocol that provides remote computer access, enabling a system to directly instruct a remote computer to execute commands. After establishing the telnet session with the provider edge router from which the connectivity test is initiated, a ping command transmitted from that provider edge router towards the provider edge router to which connectivity is tested. The ping command used in this embodiment is any suitable ping command for testing connectivity between a pair of provider edge routers within the context of a VPN.

For example, with respect to FIG. 2, after determining that a connectivity test is to be conducted between provider edge routers $PER_5$ and $PER_6$, VPN-MS 160 transmits an "initiate connectivity test" message to provider edge router $PER_5$. After receiving the "initiate connectivity test" message, the provider edge router $PER_5$ initiates a connectivity test with provider edge router $PER_6$. As described above, the connectivity test is initiated using at least one of a generic "ping" command, a "ping vrf" command, or any other suitable method of testing connectivity between routers as known in the art.

For simplicity of description, assume that in the present example, the provider edge router $PER_5$ generates a "ping vrf" command in response to the "initiate connectivity test" message received from the VPN-MS 160. As such, provider edge router $PER_5$ transmits the "ping vrf" test packet towards provider edge router $PER_6$. As depicted in FIG. 2, the "ping vrf" test packet initiated from provider edge router $PER_5$ is transmitted to provider core router $PCR_2$. Upon receiving the "ping vrf" test packet, provider core router $PCR_2$ transmits the "ping vrf" test packet to provider core router $PCR_3$. Upon receiving the "ping vrf" test packet, provider core router $PCR_3$ transmits the "ping vrf" test packet to provider edge router $PER_6$.

In one embodiment, if the provider edge router towards which the "ping vrf" test packet is transmitted receives the "ping vrf" test packet, the connectivity test is considered successful. In one further embodiment, the provider edge router towards which the "ping vrf" test packet is transmitted (provider edge router $PER_6$ in the example above) transmits a notification to the VPN-MS 160 indicating that the connectivity test was successful. In one further embodiment, the provider edge router towards which the "ping vrf" test packet is transmitted ($PER_6$ in the example above) transmits a corresponding response message to the provider edge router that originated the "ping vrf" test packet ($PER_5$ in the example above). Upon receiving the corresponding response message, provider edge router $PER_5$ transmits a notification to VPN-MS 160 indicating that the connectivity test was successful.

In one embodiment, at least one router connectivity event message is logged in response to each connectivity test. In one further embodiment, if a connectivity test from a first provider edge router to a second provider edge router fails, VPN-MS 160 creates and logs a "no connectivity" event message. A connectivity test is deemed to have failed using at least one of a plurality of methods. In one embodiment, in which provider edge router $PER_5$ does not receive an expected response message from provider router $PER_6$, provider edge router $PER_5$ transmits a notification to VPN-MS 160 indicating that the connectivity test failed.

Regardless of the use of unidirectional or bidirectional connectivity testing, failure of a connectivity test from a first provider edge router to a second provider edge router is considered to produce an identical result (identical "no connectivity" event) as the failure of a connectivity test from the second provider edge router to the first provider edge router. For example, with regard to FIG. 2, the failure of a "ping vrf" test packet from provider edge router $PER_5$ to provider edge router $PER_6$ produces the same result as the failure of a "ping vrf" test packet from provider edge router $PER_6$ to provider edge router $PER_5$. In one embodiment, in a subsequent cycle, if a connectivity test succeeds between a pair of provider edge routers for which a "no connectivity" event message was previously created and logged, that corresponding "no connectivity" event message is cleared from the event log.

In one embodiment, a router connectivity event message is adaptable for display on a user interface. For example, if a "no connectivity" event message is generated by VPN-MS 160, the "no connectivity" event message may be adapted for display on a user interface of the VPN-MS 160. In another embodiment, the "no connectivity" event message corresponding to failure of a connectivity test is transmitted by VPN-MS 160 towards at least one remote system. In one embodiment, the at least one remote system (not depicted) is a system in communication with VPN-MS 160.

In one embodiment, in which a full bidirectional connectivity test is performed between all provider edge routers in NM-VPN 202, the scope of the "initiate connectivity test" message indicates that provider edge router $PER_5$ must generate and transmit a "ping vrf" message towards each of the provider edge routers PER$_1$ through PER$_4$ (in addition to PER$_6$). Furthermore, in this embodiment, the process described above with respect to provider edge router PER$_5$ is repeated for every other provider edge router (PER$_1$, PER$_2$, PER$_3$, PER$_4$, and PER$_6$) in NM-VPN 202.

Thus, using the methodology described above, testing of connectivity between every pair of provider edge routers within the context of the NM-VPN achieves the same effect as separately testing provider edge router pairs within every customer VPN supported by the service provider network. Thus, the present invention achieves a significant reduction in the number of tests (and therefore the amount of test traffic and network resources) required in order to verify connectivity between provider edge router pairs in the service provider network.

While the connectivity tests as described with respect to FIG. 2 verify connectivity between all provider edge routers in a service provider network, the connectivity tests alone do not implement full site-to-site reachability within the context of each customer VPN. In order to verify full site-to-site reachability within the context of each customer VPN, a route monitoring methodology (in conjunction with the connectivity testing described above) is implemented to verify that at least one route exists from a customer edge router to a provider edge router. This route monitoring methodology for verification of operational statuses of edge communication links (links from a customer edge router to a provider edge router) is described below with respect to FIG. 3.

Figure 3:
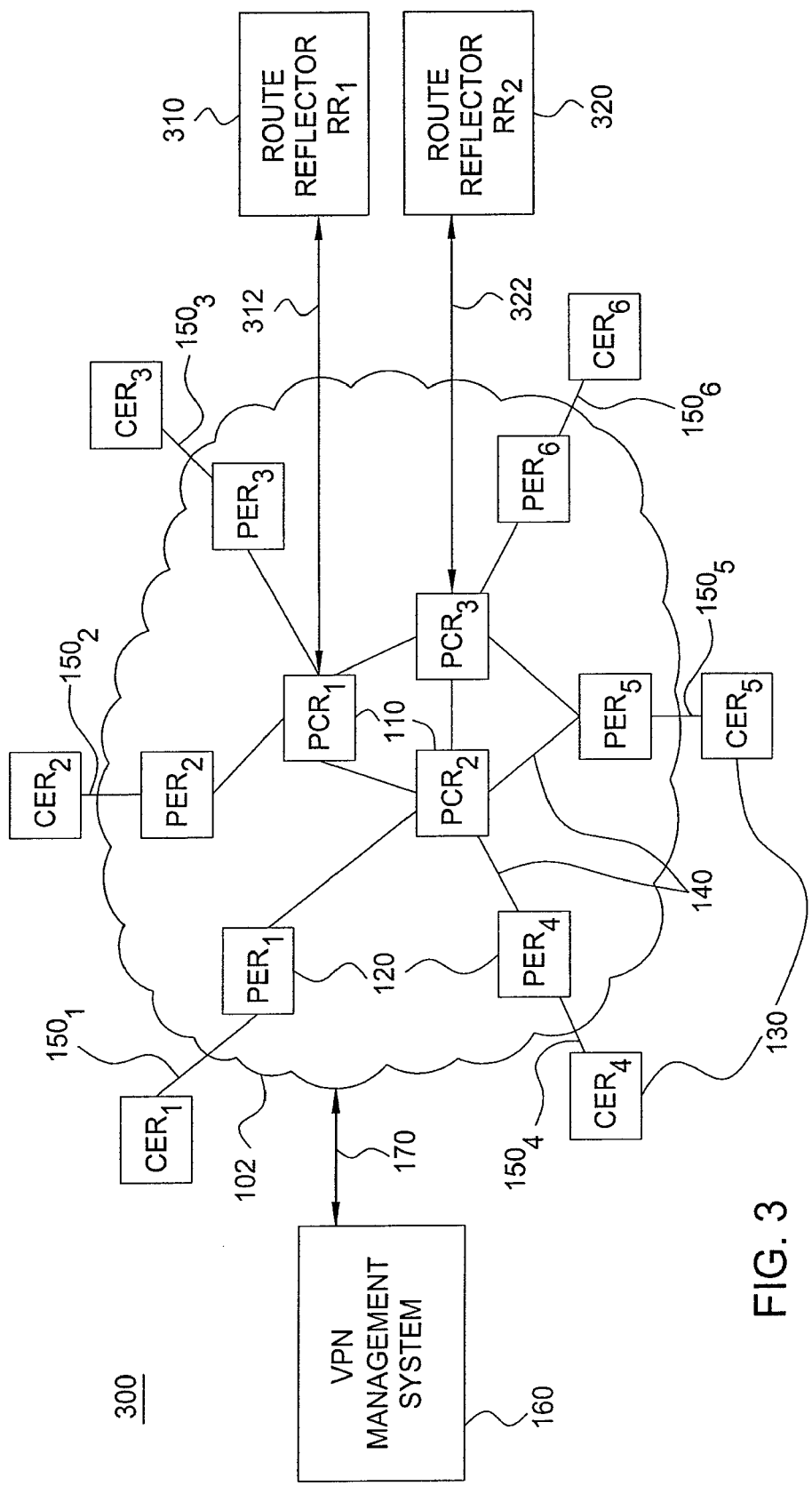
FIG. 3 depicts a network architecture including two virtual private network route reflectors in communication with the provider edge routers of the service provider network 102 of FIG. 1.

FIG. 3 depicts a network architecture including two virtual private network route reflectors in communication with the provider edge routers of the service provider network 102 of FIG. 1. Specifically, the network architecture 300 of FIG. 3 comprises a first route reflector (RR$_1$) 310 and a second route reflector (RR$_2$) 320. The network architecture 300 of FIG. 3 includes elements depicted in FIG. 1, and, as such, the elements of FIG. 3 which are the same as elements depicted in FIG. 1 are represented with identical reference numbers.

As depicted in FIG. 3, the first route reflector 310 is a stand-alone system that communicates with provider core router PCR$_1$ via a communication link 312. The first route reflector 310 communicates with provider edge routers PER$_1$, PER$_2$, and PER$_3$ via the provider core routers 110 and associated core communication links 140. Similarly, the second route reflector 320 is a stand-alone system that communicates with the provider core router PCR$_3$ via a communication link 322. The second route reflector 320 communicates with provider edge routers PER$_4$, PER$_5$, and PER$_6$ via the provider core routers 110 and associated core communication links 140.

In one embodiment, a route reflector is implemented as a stand-alone router. In another embodiment (not depicted), a route reflector is implemented as a portion of a service provider management system (illustratively, as a VPN-MS 160). Although two route reflectors are depicted and described with respect to FIG. 3, fewer or more route reflectors may be deployed. Although the first route reflector 310 and the second route reflector 320, as described with respect to FIG. 3, are defined as communicating with mutually exclusive groups of provider edge routers (and therefore maintaining mutually exclusive lists of active routes) more than one route reflector may communicate with the same provider edge router. Similarly, a single provider edge router may communicate with more than one route reflector. As such, a route reflector may communicate with any combination of provider edge routers.

The first route reflector 310 and the second route reflector 320 may communicate with each other via the service provider network 102. In one embodiment, route reflectors may communicate directly with each other. Thus, although not depicted in FIG. 3, the first route reflector 310 and the second route reflector 320 may communicate directly via one or more communication links (not shown). The VPN-MS 160 communicates with the first route reflector 310 and the second route reflector 320 via the service provider network 102 and communication link 170.

A route corresponds to an edge communication link between one of the provider edge routers and one of the customer edge routers connected to that provider edge router. A route reflector monitors the routes associated with edge communication links connected to provider edge routers with which that route reflector is configured to communicate. As such, a route reflector maintains a list of active routes associated with edge communication links connected to provider edge routers with which that route reflector is configured to communicate.

As depicted in FIG. 3, the first route reflector 310 maintains a list of the active routes associated with the edge communication links connected to provider edge routers PER$_1$, PER$_2$, and PER$_3$. As such, first route reflector 310 maintains a list of active routes corresponding to edge communication links 150$_1$, 150$_2$, and 150$_3$. Similarly, second route reflector 320 maintains a list of the active routes associated with the edge communication links connected to provider edge routers PER$_4$, PER$_5$, and PER$_6$. As such, second route reflector 320 maintains a list of the active routes corresponding to edge communication links 150$_4$, 150$_5$, and 150$_6$.

In other words, a route reflector ensures that the edge communication links associated with the provider edge routers to which that route reflector is connected are operational. A route reflector ensures that routes representing edge communication links are appropriately exchanged within a domain via Multi-Protocol Internal Border Gateway Protocol (MP-iBGP) sessions. Similarly, a route reflector ensures that the routes representing edge communication links are appropriately exchanged across domains via Multi-Protocol External Border Gateway Protocol (MP-eBGP) sessions.

A route reflector stores the routes in at least one routing table (in a memory, a database, or any other suitable means of storing the routes, as known in the art). In one embodiment, a route reflector stores active routes within the context of each customer VPN. The route reflectors maintain a consistent view of the respective operational statuses of edge communication links. Therefore, the present invention is able to perform route-monitoring of the routes associated with edge communication links via the visibility of routes to the edge communication links in the route reflector(s) associated with the service provider network.

In order to implement route-monitoring (to verify the operational status of edge communication links) a service provider management system (illustratively, the VPN-MS 160) identifies all of the edge communication link interfaces that are provisioned in the service provider network (illustratively, service provider network 102). This list is the authoritative list of routes (edge communication links) that have been provisioned in the service provider network. In one embodiment, the routes are stored locally on VPN-MS 160. In another embodiment, the provisioned routes are retrieved by VPN-MS 160 from at least one remote database.

The retrieval of active routes associated with the edge communication links depends on the implementation of the route reflectors. In one embodiment, in which the route reflectors are implemented as a portion of a service provider management system, the active routes are retrieved from at least one database on the service provider management system. In another embodiment, in which the route reflectors are implemented as routers in communication with provider edge routers of the service provider network, VPN-MS 160 selects at least one route reflector and retrieves the list of active routes associated with the edge communication links monitored by that selected route reflector(s).

The period of time between retrieval of the active routes from at least one route reflector is configurable. In one embodiment, retrieval of routes from at least one route reflector is initiated once every five minutes. In another embodiment, the retrieval of routes from at least one route reflector is initiated once each minute. In another embodiment, the retrieval of routes from at least one route reflector is initiated at least once each hour. Since the period of time between retrieval of the active routes is configurable, retrieval of active routes may be performed less or more often. The retrieval of active routes from route reflectors is accomplished using any standard method of retrieving data as known in the art (e.g., from a database if the route reflectors are implemented as a portion of the VPN-MS 160; from a remote router if the route reflectors are implemented as routers).

Upon receiving active routes associated with the edge communication links, VPN-MS 160 stores the active routes for offline processing. The routes retrieved from the at least one route reflector are stored in memory, a database, or any other component suitable for storing the information as known in the art. The VPN-MS 160 then compares the list of provisioned routes against the list of active routes retrieved from the route reflectors.

In one embodiment, at least one route monitoring event message is logged in response to each route monitoring test. If there is a provisioned route that is not included in the list of active routes, that route is deemed not to exist in the service provider network, and the edge communication link associated with that provisioned route is deemed non-operational. In one embodiment, the VPN-MS 160 creates and logs a "route missing" event message indicating that the corresponding edge communication link is non-operational (is not available for connecting the customer edge router to the corresponding provider edge router). In one embodiment, in a subsequent cycle of the method, if the missing route is restored (an active route corresponding to that edge communication link is retrieved from a route reflector), the corresponding "route missing" event message is cleared from the event log.

In one embodiment, a route monitoring event message is adaptable for display on a user interface. For example, if a "route missing" event message is generated by VPN-MS 160, that "route missing" event message is adaptable for display on a user interface of the VPN-MS 160. In another embodiment, the "route missing" event message corresponding to a non-operational edge communication link is transmitted by the VPN-MS towards at least one remote system. In one embodiment, the at least one remote system (not depicted) is a system in communication with the VPN-MS 160.

Using this methodology of route-monitoring to verify the existence of routes between provider edge routers and customer edge routers (to verify that edge communication links are operational) obviates the need to send test packets in order to verify that a particular edge communication link is available and operating correctly. As such, this method simplifies the method of verifying the existence of routes between the provider edge routers and the customer edge routers, and significantly reduces the impact to the network of performing such verification tests (by reducing test traffic that consumes valuable network resources).

Figure 4:
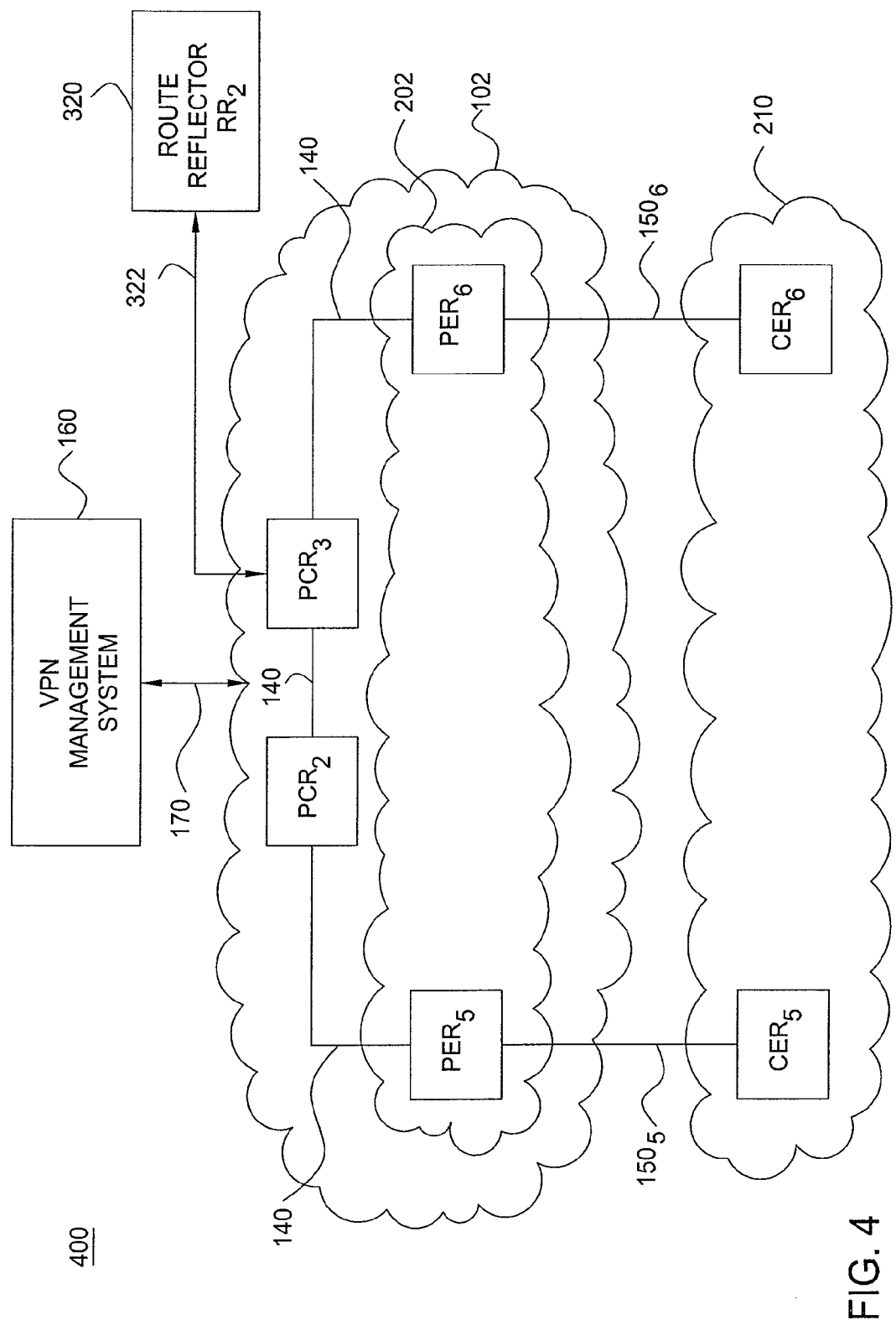
FIG. 4 depicts a connection path through the service provider network 102 of FIG. 1, in which a single site-to-site reachability test is performed using the methodologies described with respect to FIG. 2 and FIG. 3.

In one embodiment, depicted and described with respect to FIG. 4, a combination of the connectivity testing methodology and the route-monitoring methodology is used to perform full site-to-site reachability testing within the context of customer VPNs. By performing a full connectivity test between all provider edge routers in the service provider network within the context of the NM-VPN, and initiating route-monitoring of all edge communication links in the service provider network, a service provider is able to determine full site-to-site reachability between every pair-wise combination of provider edge routers (on the customer-facing side of the provider edge routers) in the service provider network.

In other words, the combination of the two methodologies provides a simplified, scalable method of ensuring that there is reachability between every pair of provider edge routers (on the customer-facing side) for any customer VPN supported by those provider edge routers. As such, use of the combination of the two methodologies provides an end-to-end view of connectivity between each of the edge communication links associated with various customer VPNs.

In order to simplify the description of the combination of the connectivity testing and route-monitoring methodologies, the methodologies are described in FIG. 4 with respect to a single connection within one customer VPN supported by the service provider network 102.

FIG. 4 depicts a connection path through the service provider network 102 of FIG. 1, in which a single site-to-site reachability test is performed using the methodologies described herein with respect to FIG. 2 and FIG. 3. The site-to-site reachability test verifies reachability from an edge communication link (illustratively, edge communication link 150$_5$) associated with one customer edge router to an edge communication link (illustratively, edge communication link 150$_6$) associated with another customer edge router within a customer VPN.

Specifically, connection path 400 of FIG. 4 comprises a path from the customer edge router CER$_5$ to the customer edge router CER$_6$. As depicted in FIG. 4, customer edge router CER$_5$ and customer edge router CER$_6$ belong to first virtual private network 210 of FIG. 2. As depicted in FIG. 1 through FIG. 4, customer edge router CER$_5$ communicates with provider edge router PER$_5$ via edge communication link 150$_5$, and customer edge router CER$_6$ communicates with provider edge router PER$_6$ via edge communication link 150$_6$. Furthermore, provider edge routers PER$_5$ and PER$_6$ communicate via provider core routers PCR$_2$ and PCR$_3$ using core communication links 140. As depicted in FIG. 2 and repeated in FIG. 4, provider edge routers PER$_5$ and PER$_6$ belong to NM-VPN 202.

In order to perform a full site-to-site reachability test from edge communication link 150$_5$ to edge communication link 150$_6$, a connectivity test is performed between provider edge router PER$_5$ and provider edge router PER$_6$ within the context of the NM-VPN 202, and a route-monitoring test is performed to verify the existence of active routes associated with edge communication link 150$_5$ and edge communication link 150$_6$.

In order to perform the connectivity test, VPN-MS 160 identifies the pair of provider edge routers for which the connectivity test is performed. After identifying the pair of provider edge routers between which connectivity is tested, VPN-MS 160 identifies an interface on provider edge router PER$_5$ ("loopback5", for example) within the context of the NM-VPN 202, and identifies an interface on provider edge router PER$_6$ ("loopback6", for example). The VPN-MS 160 initiates a connectivity test between provider edge routers $PER_5$ and $PER_6$ using the respective configured loopback interfaces.

As depicted and described with respect to FIG. 4, a unidirectional connectivity test is performed from provider edge router $PER_5$ to provider edge router $PER_6$. As such, VPN-MS 160 transmits an "initiate connectivity test" message to provider edge router $PER_5$ identifying the "loopback6" interface on provider edge router $PER_6$ as the interface with which connectivity is tested. Upon receiving the "initiate connectivity test" message, provider edge router $PER_5$ processes the message to create a corresponding "ping" command. As described above with respect to FIG. 2, provider edge router $PER_5$ creates a "ping" test packet and transmits the "ping" test packet to provider edge router $PER_6$ via the provider core routers $PCR_2$ and $PCR_3$ and the associated core communication links 140. Upon receiving the "ping" test packet from provider edge router $PER_5$, provider edge router $PER_6$ notifies VPN-MS 160 that the connectivity test is successful. In one embodiment, in which provider edge router $PER_5$ does not receive an expected response message from provider router $PER_6$, provider edge router $PER_5$ transmits a notification to VPN-MS 160 indicating that the connectivity test failed.

In order to verify site-to-site reachability within the context of first VPN 210, the VPN-MS additionally performs a route-monitoring test (in addition to the connectivity test) to verify the existence of the routes corresponding to edge communication links $150_5$ and $150_6$. The VPN-MS 160 compares the provisioned routes associated with edge communication links $150_5$ and $150_6$ to the active routes associated with edge communication links $150_5$ and $150_6$.

As described above with respect to FIG. 3, the provisioned routes are retrieved by VPN-MS 160 from at least one of a database in VPN-MS 160 and a remote database in communication with VPN-MS 160. As depicted in FIG. 4, the active routes are retrieved by VPN-MS 160 from second route reflector 320. The provisioned routes associated with edge communication links $150_5$ and $150_6$ are compared to the active routes associated with edge communication links $150_5$ and $150_6$.

The comparison of the provisioned routes to the active routes is used to determine the operational status of the edge communication links $150_5$ and $150_6$ in the connection path depicted in FIG. 4. If the provisioned routes match the active routes for both edge communication links $150_5$ and $150_6$, the edge communication links $150_5$ and $150_6$ are considered operational. If one of the provisioned routes associated with the edge communication links $150_5$ and $150_6$ is not included in the list of active routes, the edge communication link for which a match is not found is considered non-operational.

If the connectivity test from provider edge router $PER_5$ to the provider edge router $PER_6$ fails, the site-to-site reachability test from edge communication link $150_5$ to edge communication link $150_6$ is deemed a failure (regardless of respective operational statuses of the associated edge communication links $150_5$ and $150_6$). If the edge communication links $150_5$ and $150_6$, either singly or in combination, are non-operational, the site-to-site reachability test from edge communication link $150_5$ to edge communication link $150_6$ is deemed a failure. As such, the site-to-site reachability test from edge communication link $150_5$ to edge communication link $150_6$ is deemed successful only if the connectivity test is successful and both edge communication links $150_5$ and $150_6$ are operational.

In embodiment, as described above, the system performing the connectivity tests (illustratively, VPN-MS 160) logs events identified during the connectivity testing (such as "no connectivity" events). In one embodiment, as described above, the system performing the route monitoring test (illustratively, VPN-MS 160) logs event identified during the route monitoring testing (such as "route missing" events). In one embodiment, an event triangulation module is implemented to correlate the connectivity test event messages to the route monitoring event messages.

In one embodiment, the results of the event triangulation are stored locally and may be accessed by one or more users of VPN-MS. In another embodiment, at least a portion of the results of the event triangulation are transmitted towards at least one external system for further processing and/or display to other users. For example, in one embodiment, events generated from the backbone connectivity testing are transmitted to at least one management system used by a service provider network-facing organization. In another embodiment, events generated from the route-monitoring testing are transmitted to at least one management system used by a service provider customer-facing organization.

For simplicity of explanation, as depicted and described with respect to FIG. 4, a single site-to-site reachability test is performed from one edge communication link to another edge communication link within a customer VPN. Thus, although one site-to-site reachability test is described in detail herein, the scope of the site-to-site reachability tests may be expanded to include numerous other site-to-site reachability tests. As such, the scope of the present invention is not limited to a methodology for performance of one site-to-site reachability test.

In one embodiment, the methodologies described with respect to FIG. 4 are implemented for a plurality of edge communication interfaces within the context of a customer VPN. In another embodiment, the methodologies are implemented for all edge communication link interfaces within the context of a customer VPN. In another embodiment, the methodologies are implemented for a plurality of edge communication link interfaces within the context of multiple customer VPNs. In another embodiment, the methodologies are implemented for all edge communication link interfaces within the context of all customer VPNs monitored by the VPN-MS 160.

The combination of the customer-agnostic method of testing connectivity between provider edge routers and the customer-specific method of monitoring routes (edge communication links) associated with specific customer VPNs results in a simplified, scalable method of verifying the site-to-site reachability between every provider edge router within the context of all customer VPNs supported by a service provider network.

Figure 5:
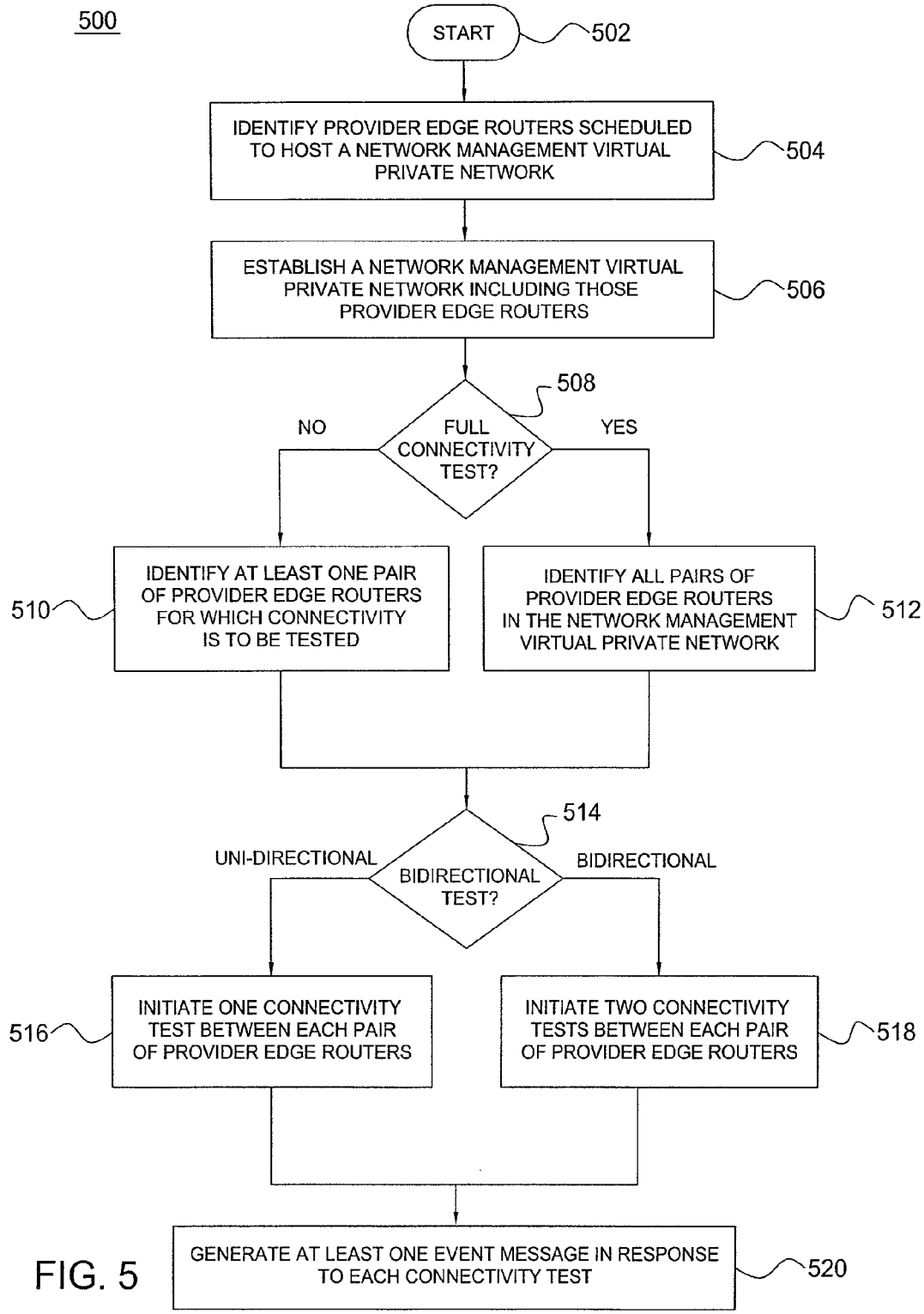
FIG. 5 depicts a flow diagram of a method of conducting connectivity tests between pairs of provider edge routers in a service provider network.

FIG. 5 depicts a flow diagram of a method according to one embodiment of the invention. Specifically, method 500 of FIG. 5 comprises a method of verifying connectivity in a network comprising a plurality of provider edge routers and a plurality of customer edge routers within at least one customer VPN. The method 500 is entered at step 502 and proceeds to step 504.

At step 504, a service provider management system performing the connectivity test identifies the provider edge routers scheduled to host a NM-VPN. In one embodiment, the service provider management system retrieves the provider edge routers scheduled to form the NM-VPN from another system. In another embodiment, the service provider management system identifies a subset of the provider edge routers with which it is configured to communicate. In another embodiment, the service provider management system identifies all provider edge routers with which it is configured to communicate. The method 500 then proceeds to step 506.

At step 506, a NM-VPN is established across the provider edge routers identified in step 504. A NM-VPN comprises at least two provider edge routers of the plurality of provider edge routers in the service provider network. The NM-VPN is established using any standard method of creating a VPN, as known in the art. The NM-VPN is customer-agnostic in that it is transparent to the customer VPNs supported by the provider edge routers on which the NM-VPN is established. The method 500 then proceeds to step 508.

At step 508, the service provider management system determines the scope of the connectivity test schedule to be performed (determines if a full connectivity test is scheduled to be performed). In one embodiment, the scope of connectivity test is determined by the service provider management system based on a pre-configured setting retrieved from a database in the service provider management system. In another embodiment, the scope of the connectivity test is determined by the service provider management system based on input from at least one user of the service provider management system. If the scope of the connectivity test is not a full connectivity test, the method 500 proceeds to step 510. If the scope of the connectivity test is a full connectivity test, the method 500 proceeds to step 512.

At step 510, the service provider management system identifies at least one pair of provider edge routers for which connectivity is scheduled to be tested. At step 512, the service provider management system identifies all pairs of provider edge routers in the NM-VPN established in step 506, in order to perform a full connectivity test is performed between all pairs of provider edge routers on which the NM-VPN was configured.

In one embodiment, the pairs of provider edge routers are identified by the service provider management system from a database including a schedule of pairs of provider edge routers between which connectivity is to be tested. In another embodiment, the pairs of provider edge routers are identified by the service provider management system based on input provided by at least one user of the service provider management system. Regardless of the scope of the connectivity test, the method 500 then proceeds to step 514.

At step 514, the service provider management system determines whether the connectivity tests initiated between the pairs of provider edge routers are unidirectional tests or bidirectional tests. If unidirectional connectivity tests are scheduled to be performed, the method 500 proceeds to step 516. If bidirectional connectivity tests are scheduled to be performed, the method 500 proceeds to step 518.

At step 516, the service provider management system initiates one connectivity test between each pair of provider edge routers identified in one of step 510 and step 512. In one embodiment, the service provider management system generates an "initiate connectivity test" message, and transmits the message towards the provider edge router from which the connectivity test will be initiated. In another embodiment, the service provider management system establishes a 'telnet' session with the provider edge router from which the connectivity test will be initiated. The connectivity test between each pair of provider edge routers is performed using at least one of a ping command, ping vrf command, and like commands for testing connectivity as known in the art.

In this embodiment, referring to FIG. 2 described above, a test from provider edge router $PER_5$ to provider edge router $PER_6$ is equivalent to a test from provider edge router $PER_6$ to provider edge router $PER_5$. As such, once a test from provider edge router $PER_5$ to provider edge router $PER_6$ is complete, no test from provider edge router $PER_6$ to provider edge router $PER_5$ is initiated. Use of this embodiment of the present invention further reduces the number of connectivity tests that must be performed in order to verify connectivity between a plurality of provider edge routers using a NM-VPN. The method 500 proceeds to step 520.

At step 518, the service provider management system initiates two connectivity tests between each pair of provider edge routers identified in one of step 510 and step 512, described above. In one embodiment, service provider management system generates two "initiate connectivity test" messages, and transmits the messages towards the two respective provider edge routers from which the two connectivity tests will be initiated. In another embodiment, the service provider management system establishes 'telnet' sessions with the two provider edge routers from which the two connectivity tests will be initiated. The connectivity test between each pair of provider edge routers is performed using at least one of a ping command, ping vrf command, and like commands for testing connectivity as known in the art.

In this embodiment, referring to FIG. 2 described above, one test is performed to test the connectivity from provider edge router $PER_5$ to provider edge router $PER_6$, and a corresponding test is performed in the opposite direction in order to test the connectivity from provider edge router $PER_6$ to provider edge router $PER_5$. In this embodiment, testing in both directions is required in order to confirm connectivity between a pair of provider edge routers. The method of testing is at least one of the method described above (such as ping commands, ping vrf commands, and like methods of testing connectivity as known in the art). The method 500 then proceeds to step 520.

At step 520, the service provider management system generates at least one event message in response to performance of a connectivity test. In one embodiment, the at least one event message (a router connectivity event message) is generated in response to successful, as well as unsuccessful, connectivity tests. In another embodiment, in order to reduce the number of generated event messages, an event message is only generated in response to an unsuccessful connectivity test. In this embodiment, the event message that is generated is a "no connectivity" event message.

A connectivity test is deemed to have failed (to be unsuccessful) using at least one of a plurality of methods as known in the art. Regardless of the use of unidirectional or bidirectional connectivity testing, a failure of a connectivity test from a first provider edge router to a second provider edge router is considered to produce an identical result (identical "no connectivity" event) as the failure of a connectivity test from the second provider edge router to the first provider edge router. For example, with regard to FIG. 2, a failure of a "ping vrf" test packet from provider edge router $PER_5$ to provider edge router $PER_6$ produces the same result as a failure of a "ping vrf" test packet from provider edge router $PER_6$ to provider edge router $PER_5$.

In one embodiment, each event message is stored in the service provider management system (in memory, a database, or any other component suitable for logging event messages). In one embodiment, the event messages are adaptable for display to a user interface on a service provider management system (such as the VPN-MS 160). In one embodiment, if a connectivity test succeeds between a pair of provider edge routers for which a "no connectivity" event was previously created and logged, the previously created and logged "no connectivity" event is cleared from the event log.

The testing of connectivity between every pair of provider edge routers using the NM-VPN achieves the same effect as separately testing pairs of provider edge routers within the context of each customer VPN supported by the service provider network. Therefore, since the present invention does not require connectivity testing within the context of each customer VPN, the present invention achieves a significant reduction in the number of tests (and therefore the amount of test traffic and network resources) required in order to verify connectivity between all provider edge router pairs in the service provider network.

Figure 6:
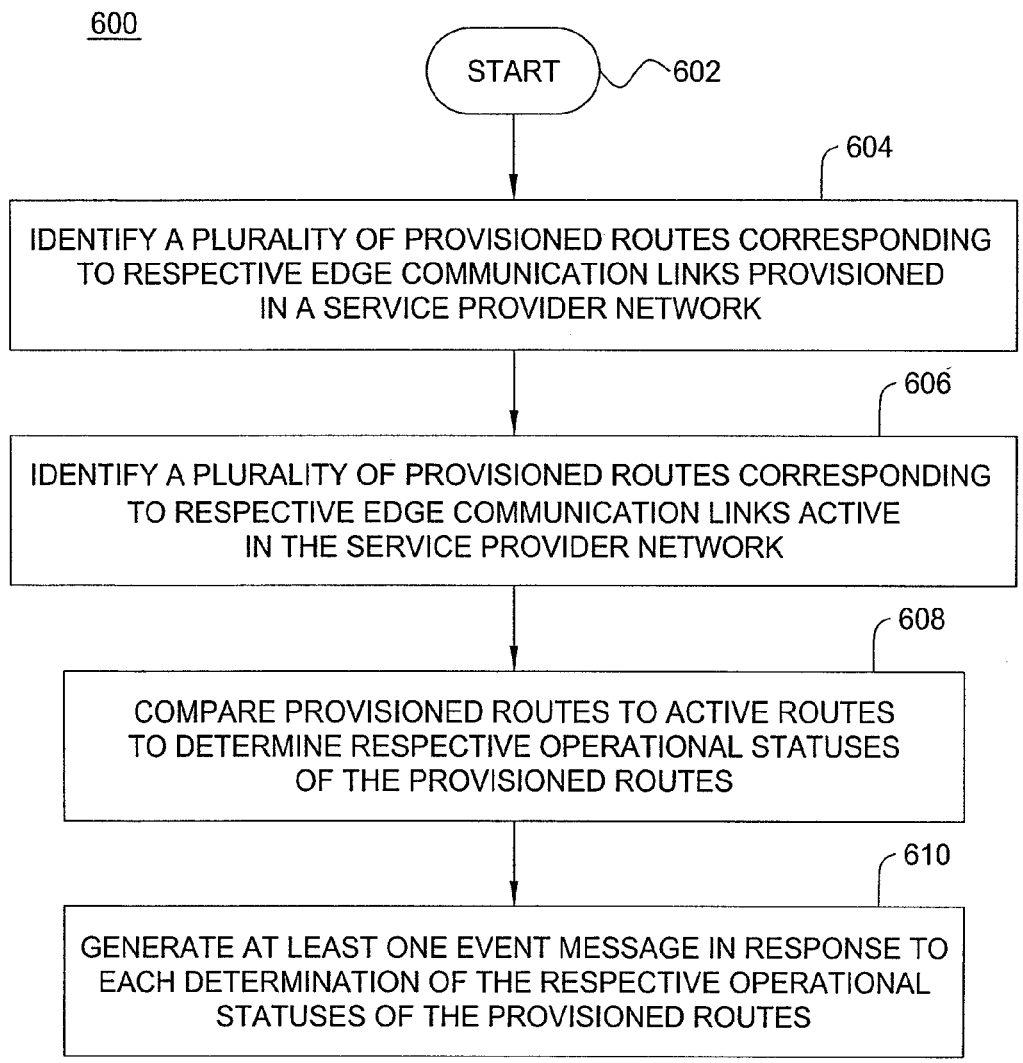
FIG. 6 depicts a flow diagram of a method of verifying the existence of routes corresponding to edge communication links.

FIG. 6 depicts a flow diagram of a method according to one embodiment of the invention. Specifically, method 600 of FIG. 6 comprises a method of determining respective operational statuses of edge communication links connecting provider edge routers to respective customer edge routers. The method 600 is entered at step 602 and proceeds to step 604.

At step 604, the service provider management system (VPN-MS 160, for example) identifies a plurality of provisioned routes corresponding to respective edge communication links provisioned in a service provider network (service provider network 102, for example). A provisioned route corresponds to an edge communication link between a provider edge router and a customer edge router that is provisioned in the service provider network, regardless of the operational status of that edge communication link. In one embodiment, provisioned routes are retrieved from at least one database in the service provider management system. In another embodiment, provisioned routes are retrieved by the service provider management system from at least one remote system in communication with the service provider management system. The method 600 then proceeds to step 606.

At step 606, the service provider management system identifies a plurality of active routes corresponding to respective edge communication links that are active within the service provider network. An active route corresponds to an edge communication link having an associated route-target that is actively exchanged within the service provider network. As described above with respect to FIG. 3, in one embodiment, the active routes are retrieved by the service provider management system from at least one route-reflector in the service provider network. The method 600 then proceeds to step 608.

At step 608, the service provider management system compares the identified provisioned routes to the identified active routes in order to determine respective operational statuses of each of the provisioned routes. A provisioned route for which a corresponding active route is identified (a matching active route is found) indicates that the edge communication link associated with that route is operational. A provisioned route for which no corresponding active route is identified (no matching active route) indicates that the edge communication link associated with that route is non-operational. The method 600 then proceeds to step 610.

As such, an edge communication link is considered operational when the provisioned route associated with that edge communication link is operational. An operational route indicates that the edge communication link interfaces are operational, and that the route representing the corresponding edge communication link is successfully exchanged via Multi-Protocol Border Gateway Protocol Sessions. For intra-domain communication, the routes are exchanged via Multi-Protocol Internal Border Gateway Protocol (MP-iBGP) sessions. For inter-domain communication, the routes are exchanges via Multi-Protocol External Border Gateway Protocol (MP-eBGP) sessions.

An edge communication link is considered non-operational when the provisioned route associated with that edge communication link is non-operational. A provisioned route is determined to be non-operational when no corresponding active route is identified for that edge communication link. An active route is not identified when the corresponding edge communication link interface is non-operational. An active route is not identified when that route is not successfully exchanged via Multi-Protocol Border Gateway Protocol (MP-BGP) sessions.

At step 610, the service provider management system generates at least one event message (route monitoring event message) in response to each determination of the respective operational statuses of the provisioned routes (each performance of a route-monitoring test). In one embodiment, at least one event message is generated in response to successful, as well as unsuccessful, route-monitoring tests.

In one embodiment, in order to reduce the number of event messages that are generated, an event message is only generated in response to an unsuccessful route-monitoring test. In this embodiment, the event message that is generated is a "route missing" event missing. A route-missing event is generated in response to identification of a non-operational provisioned route (non-operational edge communication link). In one embodiment, VPN-MS 160 generates and logs a "route missing" event indicating that a corresponding edge communication link is non-operational (is not available for connecting a customer edge router to a corresponding provider edge router).

In one embodiment, each "route missing" event message is stored in the service provider management system (in a memory, a database, or any other component suitable for logging event messages). In one embodiment, the event messages are adaptable for display to a user interface on the service provider management system (such as the VPN-MS 160). In one embodiment, if a missing route is restored (an active route corresponding to that edge communication link is retrieved from the route reflectors), the corresponding "route missing" event is cleared from the event log.

In one embodiment, described herein with respect to FIG. 4, the methods as depicted in FIG. 5 and FIG. 6 (and described with respect to FIG. 2 and FIG. 3) are performed contemporaneously in order to verify site-to-site reachability between pairs of provider edge routers within the context of customer VPNs. In other words, the combination of methodologies implements site-to-site reachability testing between pairs of edge communication links. This method is described below with respect to FIG. 7.

Figure 7:
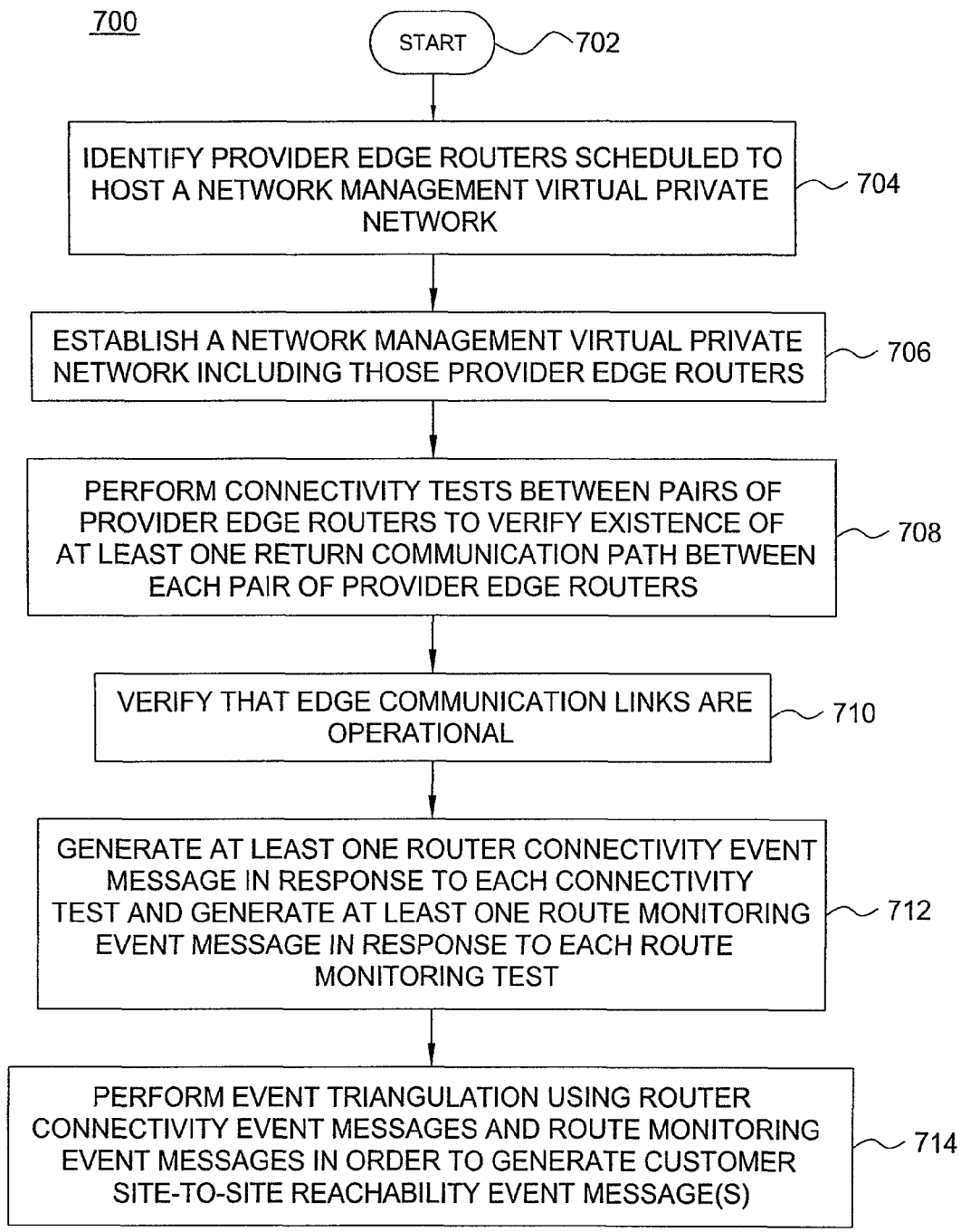
FIG. 7 depicts a flow diagram of a method of verifying site-to-site reachability within the context of a customer virtual private network.

FIG. 7 depicts a flow diagram of a method according to one embodiment of the invention. Specifically, method 700 of FIG. 7 comprises a method of determining site-to-site reachability within the context of customer VPNs supported by a service provider network. The method 700 is entered at step 702 and proceeds to step 704.

At step 704, the service provider management system (VPN-MS 160, for example) identifies provider edge routers scheduled to host a NM-VPN. A NM-VPN comprises at least two provider edge routers of the plurality of provider edge routers in the service provider network. At step 706, the service provider management system establishes the NM-VPN including the provider edge routers identified in step 704.

At step 708, the service provider management system performs connectivity tests between pairs of provider edge routers in the NM-VPN. The connectivity tests verify the existence of at least one forward communication path and at least one return communication path between each pairs of provider edge routers. In one embodiment, the at least one forward communication path and the at least one return communication path are label switched paths.

At step 710, the service provider management system verifies that edge communication links associated with customer VPNs supported by the service provider network are operational. At step 712, the service provider management system generates at least one event message (router connectivity event message) in response to each connectivity test, and generates at least one event message (route monitoring event message) in response to each route monitoring test. In one embodiment, the event messages are generated for both successful, as well as unsuccessful, test results.

In another embodiment, event messages are generated only for unsuccessful tests. In this embodiment, the service provider management system generates at least one event message ("no connectivity" event message) in response to the failure of a connectivity test, and generates at least one route monitoring event message ("route missing" event message) in response to a determination that an edge communication link is non-operational.

At step 712, the service provider management system (such as VPN-MS 160) performs event triangulation using the router connectivity event messages and route monitoring event messages in order to generate customer site-to-site reachability event messages. In one embodiment, the customer site-to-site reachability event messages are generated for both successful, as well as unsuccessful, site-to-site reachability test results. In another embodiment, customer site-to-site reachability event messages are generated only for unsuccessful tests.

If a "no connectivity" event message was generated for a pair of provider edge routers corresponding "no reachability" event messages are generated within the context of each customer VPN supported by that pair of provider edge routers. Similarly, if a "route missing" event message was generated for an edge communication link, a corresponding "no reachability" event message is generated within the context of the customer VPN supported by that edge communication link.

In one embodiment, each "no reachability" event message is stored in the service provider management system (in a memory, a database, or any other component suitable for logging event messages). In one embodiment, the "no reachability" event messages are adaptable for display to a user interface on the service provider management system (such as the VPN-MS 160). In one embodiment, at least a portion of the "no reachability" event messages are transmitted from the service provider management system towards at least one external system (such as a network-facing management system, a customer-facing management system, and the like).

Figure 8:
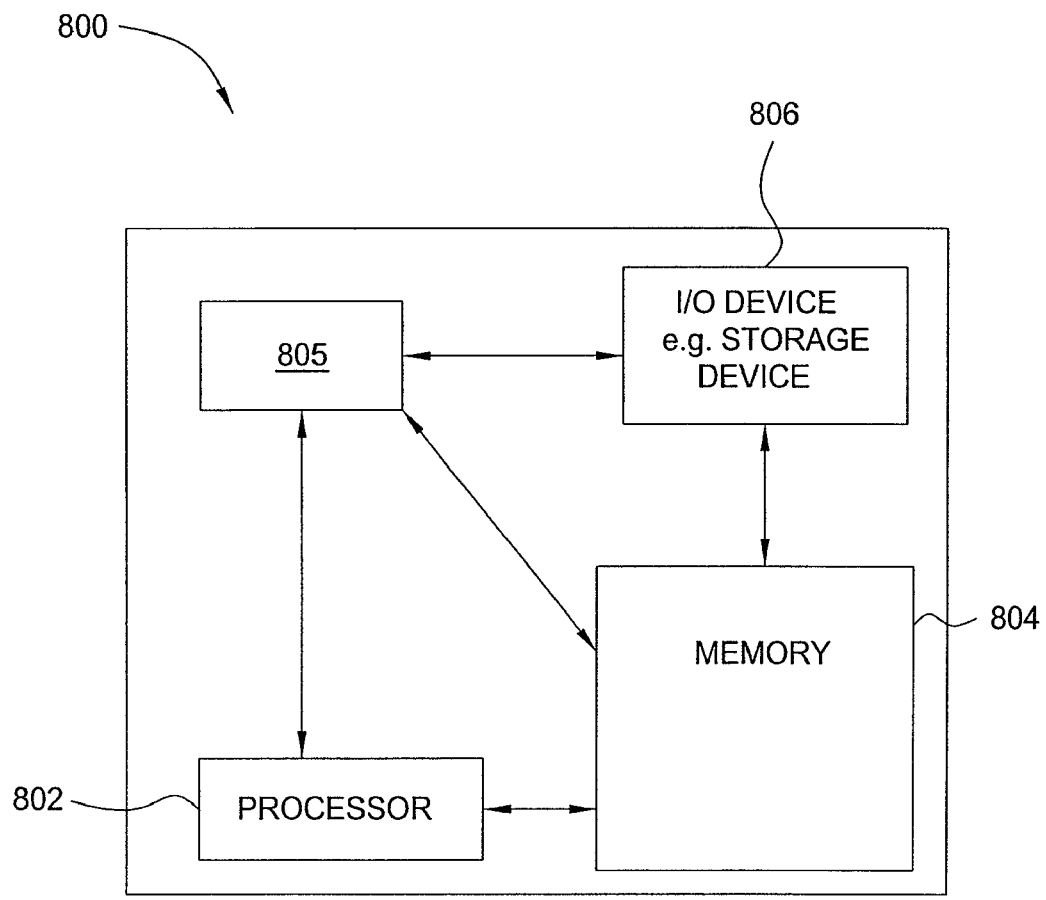
FIG. 8 depicts a high level block diagram of a general purpose computer suitable for use in performing the functions described herein.

FIG. 8 depicts a high level block diagram of a general purpose computer suitable for use in performing the functions described herein. As depicted in FIG. 8, the system 800 comprises a processor element 802 (e.g., a CPU), a memory 804, e.g., random access memory (RAM) and/or read only memory (ROM), a test module 805, and various input/output devices 806 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present test module or process 805 can be loaded into memory 804 and executed by processor 802 to implement the functions as discussed above.

As such, the present test process 805 (including associated data structures) of the present invention can be stored on a computer readable medium or carrier, e.g., RAM memory, magnetic or optical drive or diskette and the like.

The memory 804 is coupled to processor 802 and stores information related to the service provider network, the network management virtual private network, provisioned routes associated with edge communication links, and other information required for implementing the methodologies of the present invention. Furthermore, in an embodiment in which event messages (router connectivity event messages, route monitoring event messages, customer site-to-site reachability event messages) are created and logged, at least a portion of the event messages are stored in the memory 804.

The input/output devices 806 enable a user to configure a NM-VPN, manually initiate at least one connectivity test between pairs of provider edge routers of the NM-VPN, configure connectivity tests to be automatically performed periodically, and view resulting router connectivity event messages. The input/output devices 806 enable a user to manually initiate at least one route-monitoring test to determine which edge communication links are non-operational, configure route monitoring tests to be automatically performed periodically, and view resulting route monitoring event messages. Furthermore, the input/output devices 806 enable a user to manually initiate at least one site-to-site reachability test to determine site-to-site reachability within the context of customer VPNs, to configure site-to-site reachability tests to be automatically performed periodically, and to view resulting customer site-to-site reachability event messages.

The methodologies of the present invention enable a service provider to test site-to-site reachability (in a scalable way) within the context of customer VPNs communicating over a service provider network. As such, the present invention reduces the number of connectivity tests required to test site-to-site reachability within the context of each customer VPN to a factor of the number of provider edge routers in the service provider network. The methodologies of the present invention significantly reduce the amount of test traffic required to implement site-to-site reachability testing. Furthermore, the methodologies of the present invention extend the scope of the service provider network management boundary to the customer edge side of the edge communication links, while reducing the number of required test packets required in order to monitor the network to the extended boundary.

The present invention provides a method of identifying the location of a problem with a customer VPN. Thus, by performing the methodologies of the present invention, a service provider is able to determine whether a network problem is located within the service provider network or within a customer network. Thus, if a customer notifies the service provider of a service problem, the service provider may use the methodologies of the present invention to either inform the customer that there is a problem with the service provider core network, or to inform the customer that the problem is in the customer portion of the network.

Although various embodiments which incorporate the teachings of the present invention have been shown and described in detail herein, those skilled in the art can readily devise many other varied embodiments that still incorporate these teachings.

What is claimed is:

1. A method for verifying connectivity in a network comprising a plurality of provider edge routers and a plurality of customer edge routers within a customer virtual private network, comprising:

establishing a network management virtual private network, wherein the network management virtual private network includes at least two provider edge routers of the plurality of provider edge routers that do not support customers and are not associated with any customer interface;

initiating a connectivity test between a pair of provider edge routers of the at least two provider edge routers in the network management virtual private network;

identifying a plurality of provisioned routes, wherein each of the provisioned routes corresponds to a respective edge communication link provisioned in a service provider network;

identifying a plurality of active routes, wherein each of the active routes corresponds to a respective edge communication link active in the service provider network; and comparing the provisioned routes to the active routes for determining operational statuses of the respective edge communication links, wherein the determining operational statues comprises:

determining that a respective edge communication link is operational if an active route corresponding to the respective edge communication link is identified that matches a provisioned route corresponding to the respective edge communication link; and determining that a respective edge communication link is non-operational if no active route corresponding to the respective edge communication link is identified that matches a provisioned route corresponding to the respective edge communication link.

2. The method of claim 1, wherein the establishing the network management virtual private network comprises configuring an interface on each of the at least two provider edge routers of the plurality of provider edge routers.

3. The method of claim 2, wherein the interface is a loopback interface.

4. The method of claim 1, wherein the connectivity test verifies that a forward communication path and a reverse communication path exist between the pair of provider edge routers.

5. The method of claim 4, wherein the forward communication path and the reverse communication path are label switched paths.

6. The method of claim 1, wherein the initiating the connectivity test between the pair of the provider edge routers comprises:

initiating a telnet session from a management system to a first provider edge router in the pair of provider edge routers; and initiating a connectivity test from the first provider edge router to a second provider edge router in the pair of provider edge routers.

7. The method of claim 6, wherein the connectivity test comprises transmitting a test packet towards the second provider edge router.

8. The method of claim 1, wherein the connectivity test is performed using a ping command.

9. The method of claim 1, wherein the identifying the plurality of active routes comprises retrieving the active routes from a route reflector in communication with the plurality of provider edge routers.

10. The method of claim 1, further comprising:

generating a router connectivity event message in response to the connectivity test; and generating a route monitoring event message in response to the comparing the provisioned routes to the active routes for determining operational statuses of the respective edge communication links.

11. The method of claim 10, wherein the router connectivity event message is generated in response to a failure of the connectivity test and the route monitoring event message is generated in response to a determination that one of the respective edge communication links is non-operational.

12. A method for determining respective operational statuses of edge communication links connecting provider edge routers to respective customer edge routers, comprising:

identifying a plurality of provisioned routes, wherein each of the provisioned routes corresponds to a respective edge communication link provisioned in a service provider network;

identifying a plurality of active routes, wherein each of the active routes corresponds to a respective edge communication link active in the service provider network; and comparing a list of the provisioned routes to a list of the active routes to determine if any one of the provisioned routes is not included in the list of active routes for determining operational statuses of the respective edge communication links, wherein the determining operational statues comprises:

determining that a respective edge communication link is operational if an active route corresponding to the respective edge communication link is identified that matches a provisioned route corresponding to the respective edge communication link; and determining that a respective edge communication link is non-operational if no active route corresponding to the respective edge communication link is identified that matches a provisioned route corresponding to the respective edge communication link.

13. The method of claim 12, wherein the identifying the plurality of provisioned routes comprises retrieving the list of the provisioned routes from a database.

14. The method of claim 12, wherein the identifying the plurality of active routes comprises retrieving the list of the active routes from a route reflector in communication with the provider edge routers.

15. The method of claim 12, further comprising:

generating an event message in response to one of the plurality of provisioned routes in the list of the provisioned routes being non-operational.

\* \* \* \* \*